United States Patent [19]

Becker et al.

[11] 4,295,687
[45] Oct. 20, 1981

[54] ELECTRIC BRAKE SYSTEM

[75] Inventors: James Becker, Ann Arbor; Daniel L. Neill, Belleville, both of Mich.

[73] Assignee: Kelsey Hayes Company, Romulus, Mich.

[21] Appl. No.: 15,572

[22] Filed: Feb. 26, 1979

[51] Int. Cl.³ ............................................. B60T 13/68
[52] U.S. Cl. ...................................... 303/20; 188/3 R
[58] Field of Search ............... 303/20, 7, 92; 188/3 R, 188/112 R; 307/265, 267, 356; 332/9 R

[56] References Cited

U.S. PATENT DOCUMENTS

| | | | |
|---|---|---|---|
| 3,135,358 | 6/1964 | Greentree | 188/3 R |
| 3,423,135 | 1/1969 | Beltramo | 303/20 |
| 3,714,470 | 1/1973 | Goldberg | 307/265 X |
| 3,740,491 | 6/1973 | Cook et al. | 332/9 R X |
| 3,838,888 | 10/1974 | Gynn | 188/3 R X |
| 3,909,075 | 9/1975 | Pittet, Jr. et al. | 303/20 X |
| 3,981,544 | 9/1976 | Tomecek et al. | 303/92 |
| 4,033,630 | 7/1977 | Hubbard | 303/20 X |

Primary Examiner—J. D. Miller
Assistant Examiner—Reinhard J. Eisenzopf
Attorney, Agent, or Firm—Ralph J. Skinkiss; Hugh L. Fisher; Oliver E. Todd, Jr.

[57] ABSTRACT

The control system for electrically operated brakes utilizes solid state electronic components to control the braking mechanism in a towed vehicle. Energy is provided by a pulsating voltage, the pulse width of which is varied by a pulse width modulator in accordance with the amount of braking effort desired for the vehicle being towed. The pulse width modulator has the width of its output pulse directly controlled by either a hand control, or by a foot pedal control, or in response to the brake hydraulic pressure for the hydraulic brake system of the towing vehicle. Protection against short circuit conditions in the towed vehicle is provided which disables the modulator from producing output pulses for a predetermined period of time. Adjustment of the ratio of braking effort in the towed vehicle to the braking effort in the towing vehicle is provided so as to compensate for different towed vehicle to towing vehicle weight ratios. A transducer develops a control signal corresponding to the braking effort desired, and may be actuated by the hydraulic brake system of the towing vehicle, or alternatively may be actuated from the foot pedal itself. The transducer is adapted to provide a substantially linear relationship between the towed vehicle brake force and the towing vehicle brake effort, either from brake system hydraulic pressure or from brake pedal force.

7 Claims, 9 Drawing Figures

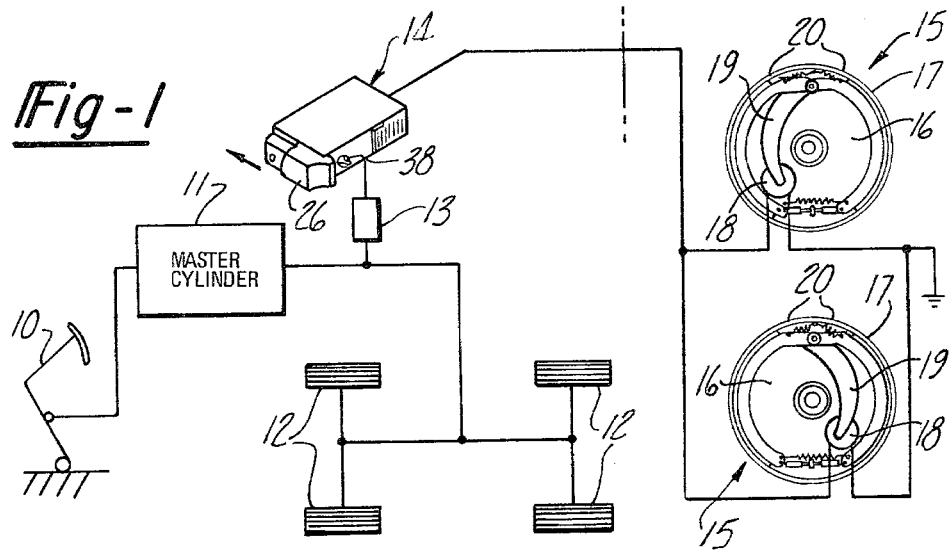
Fig-1
Fig-2
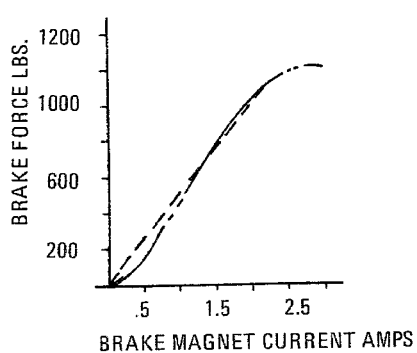
Fig-3
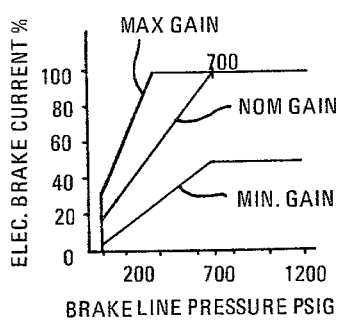
Fig-4

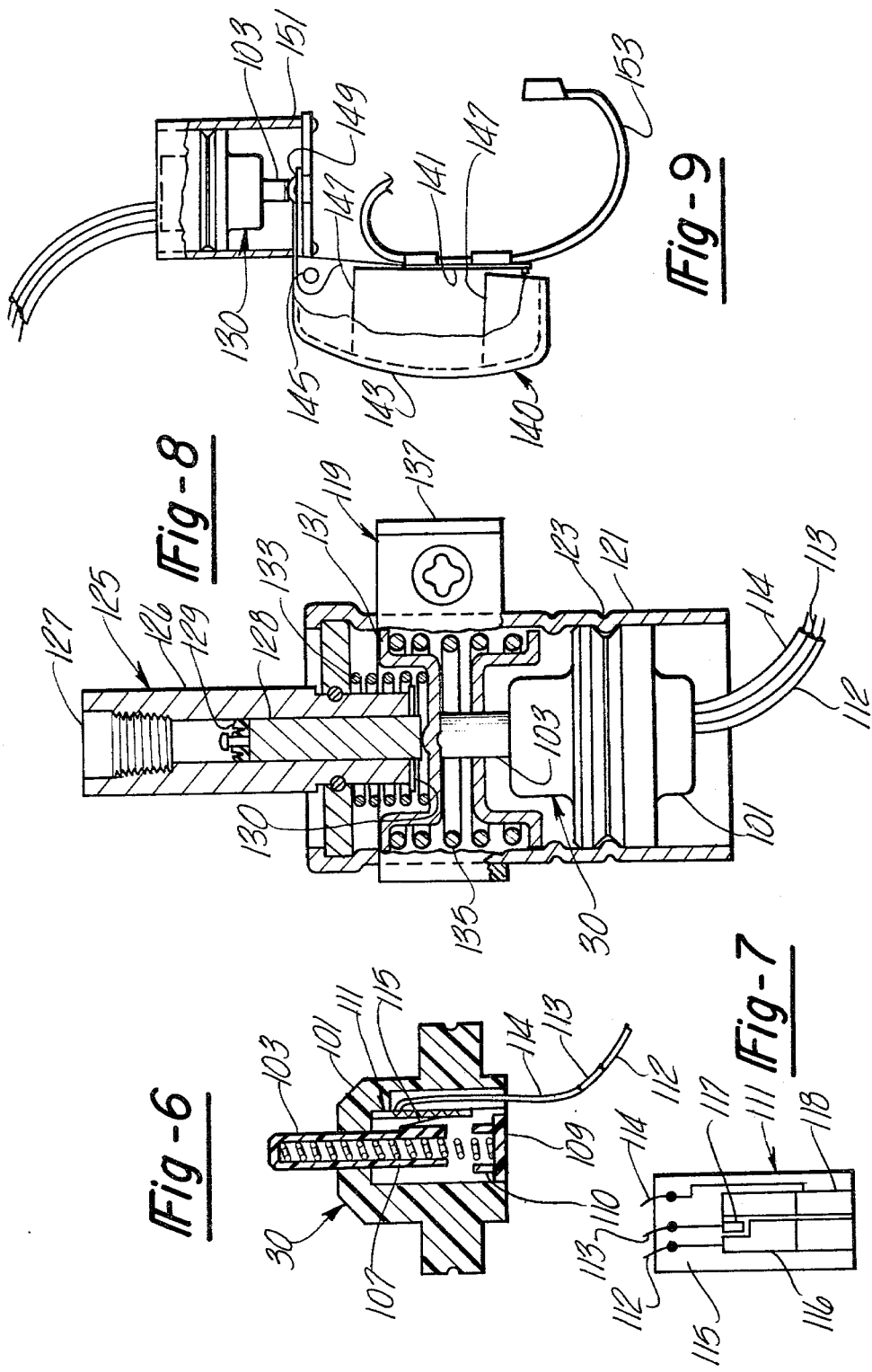

ELECTRIC BRAKE SYSTEM

This invention relates to vehicle braking systems and more specifically to electric braking systems to be used by a towed vehicle when being pulled by a towing vehicle.

Controls for electrically operated brakes, such as those used for recreational and utility trailers adapted to be towed by automobiles and small trucks, must be easily adjustable to accommodate different relative weights of the towed and towing vehicles. The controls must further be reliable and give the driver of the towing vehicle a feeling of smooth control and positive brake operation both upon applying the braking effort to the towing vehicle and also upon releasing the braking effort.

Among the objects and features contemplated with the present invention is the provision of an electric brake control system for towed vehicles which can provide a wide range of control over the braking effort of a towed vehicle.

Another object is to provide a simple and reliable electric brake system.

Another object is to provide brake short circuit protection for an electric brake system.

A further object is to provide a smooth-acting electric brake system whose braking effort can be varied in accordance with the pressure from a hydraulically operated braking system in a towing vehicle.

A further object is to provide an electric brake system that is varied in accordance with the force applied to the towing vehicle brake pedal.

A further object is to provide an electric brake system that does not actuate the towed vehicle brakes until a certain minimum level of braking effort has been established.

A further object is to provide an electric brake system that provides balanced braking between the towed and the towing vehicle over a wide range of braking conditions and vehicle weights.

A further object is to provide an electric brake system wherein there is a substantially linear relationship between the towed vehicle brake magnet current and the towing vehicle brake force.

A further object is to provide an electric brake system that can be either foot or hand operated from the towing vehicle.

A further object is to provide an electric brake system that incorporates a unique potentiometer that facilitates achievement of substantial linearity between the towing vehicle brake effort and towed vehicle brake current.

A further object is to provide a novel potentiometer for an electric brake system that can be used either with a braking hydraulic pressure transducer or a brake pedal force transducer.

Other objects and features will be apparent from the accompanying drawings, in which:

FIG. 1 is a schematic diagram of an electric brake system incorporating the principles of the invention, FIG. 2 is a schematic of another embodiment of the electric brake system, FIG. 3 is a graph depicting a typical brake force vs. brake magnetic current curve.

FIG. 4 is a graph depicting brake current vs. brake line pressure,

FIG. 6 is a sectional view of potentiometer used in the present system,

FIG. 7 is a view partially schematic of a resistor employed by the FIG. 6 potentiometer, FIG. 8 is a sectional view of a pressure transducer incorporating the FIG. 6 potentiometer, and FIG. 9 is a view, partially in section, of a brake pedal transducer assembly incorporating the FIG. 6 potentiometer.

Figure 5:
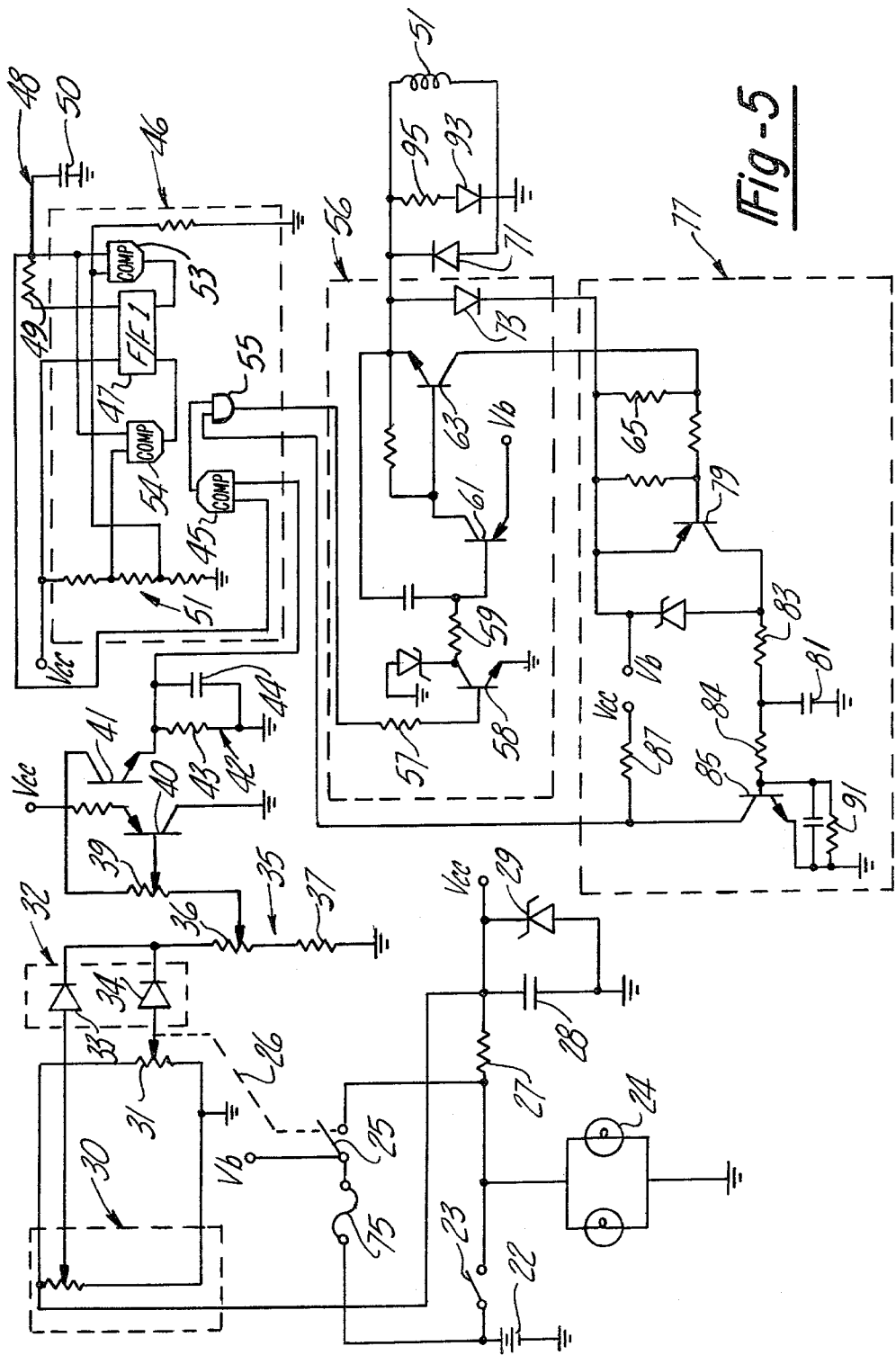
FIG. 5 is a diagram of the circuitry for the electric brake system.

Referring first to FIG. 1, the numeral 10 denotes a brake pedal for conventional brake system for a towing vehicle. The brake system comprises a master cylinder 11 and hydraulic wheel brakes denoted at 12. The FIG. 1 electric brake system also includes a pressure transducer assembly 13 which senses the brake system hydraulic pressure and in response thereto develops a corresponding control signal which is utilized by a control system or controller, shown generally at 14. This control system 14 controls electric brakes 15 for a towed vehicle such as a trailer. These electric brakes 15 can be of any well known type and by way of example may include an armature disk 16 which may be a vertical surface portion of the usual brake drum 17 and an electromagnet 18, which when energized is magnetically attracted to the disk 16 so as to exert a frictional force on a lever system 19. The lever system 19 then cause brake shoes 20 to be actuated thereby providing a braking force in accordance with the magnitude of the input signal.

FIG. 2 illustrates another embodiment of the invention wherein the brake pedal 10 includes a brake pedal transducer assembly 21 which develops an input signal in accordance with the amount of foot pedal effort exerted by the towing vehicle operator. This input signal is supplied to the controller 14 and serves the same function as the input signal in the FIG. 1 embodiment.

Considering next the FIG. 5 circuitry, power for operation of the circuitry is obtained from a conventional vehicle battery 22 either when a brake switch 23 for the towing vehicle is actuated by the brake pedal 10, which also operates brake lights 24, or when a manual switch 25 is operated by a hand control 26. The hand control 26 is shown in FIG. 1 on the front of the controller 14. The hand control 26 is movable in the direction of the arrow against the bias of a spring (not shown). This battery voltage Vb is stabilized through a circuit including a voltage dropping resistor 27 and a filter capacitor 28. A zener diode 29 is also provided to establish the control voltage Vcc at the optimum voltage for the circuit components chosen and to prevent transient voltages from damaging components supplied with the voltage Vcc.

The voltage Vcc is applied to the top of a brake force potentiometer 30 which in the FIG. 1 embodiment is responsive to the hydraulic brake pressure in the brake system for the towing vehicle and in the FIG. 2 embodiment is responsive to the force applied to the brake pedal 10 of the towing vehicle. The voltage Vcc is also applied to the top of a hand control potentiometer 31, which is operated by the hand control 26 so that a hand override is provided enabling the towed vehicle brakes to be tested or operated separate from the brakes of the towing vehicle, such as when descending a long grade, or in an emergency when the towing vehicle brakes fail.

In the absence of input from the hand control potentiometer 31, or when the brake force control voltage exceeds the hand control voltage, the brake force control voltage will prevail as the input to the controlled circuits. Either this brake force control voltage or the hand control voltage is supplied to an OR gate 32 which includes diodes 33 and 34 and then to a voltage divider 35 comprising a trim or gain potentiometer 36 and a fixed resistor 37. The trim potentiometer 36 is adjusted by a control knob 38 on the side of the controller 14. As will be explained, the trim potentiometer 36 provides gain control for the system.

A threshold potentiometer 39 is provided in the base circuit of a transistor 40 which amplifies the current in accordance with the voltage applied through the base connection. The output of the transistor 40 is applied directly to the base of another amplifier transistor 41 whose output is applied across a load circuit 42. The transistors 40 and 41 function as a zero offset emitter follower to provide required impedance match. The load circuit 42 comprises a resistor 43 and a parallel capacitor 44. The output voltage developed across resistor 43 is then applied to one of the inputs to a comparator 45 in a pulse width modulator, indicated generally by the reference numeral 46. The pulse width modulator 46 consists of a free running oscillator 47 whose frequency is controlled by an RC circuit 48 consisting of a resistor 49 and a capacitor 50. For the present application, the combination of resistance and capacitance is chosen to produce a frequency between 200 and 1000 hertz. The frequency must be high enough to prevent chatter at an electrically operated braking coil 51 for the electromagnet 18 but should not be so high as to produce radio frequency interference or problems with high frequency propagation in the wiring of the towing or towed vehicle.

The pulse width modulator also includes comparators 53 and 54. Each comparator compares the voltage across the capacitor 50 with a reference voltage, which can be selected portion of the control voltage Vcc, as determined by a voltage divider 52. Therefore, when the voltage across the capacitor 50 drops below a certain percentage of the control voltage Vcc, an output from the comparator 53 will be supplied to the oscillator 47 and set the oscillator 47 so as to produce a high voltage. Similarly, when the voltage across the capacitor 50 exceeds a certain percentage of the control voltage Vcc an output from the comparator 54 will be supplied to the oscillator 47 and reset the oscillator 47 so as to produce a low voltage. With these inputs from the comparators 53 and 54, the oscillator 47 will develop an output with a rectangular wave-form which is supplied to the capacitor 50 through the resistor 49. Consequently, there will be developed across the capacitor 50 a voltage with an approximately triangular wave-form which voltage is supplied to the other of the inputs to the comparator 45.

The comparator 45 functions to compare the amplitude of the triangular wave-form with the DC level of the control signal from the transistor 41 to develop an output pulse width proportional to the DC level at the triangular wave-form frequency and an output the average value of which is linear with the input.

This pulse-width modulator output is now fed through an AND gate 55 to a current amplifier 56 and is amplified through three stages to provide a high current rectangular shaped signal suitable for energizing the braking coil 51.

The pulse width modulated signal output from the comparator 45 is applied through a resistor 57 to the base of the transistor 58. This amplifier transistor 58 is directly coupled through a resistor 59 to the base of a second transistor 61, whose collector is directly connected to the base electrode of the output transistor 63. The main current path for the output of current now goes from battery voltage Vb, through a resistor 65 of very low value, to be described in more detail hereinafter, through the emitter-collector path of the transistor 63 and through the braking coil 51 and back to the grounded side of the battery 22. The effective braking voltage is now variable width pulses, the duty cycle of which pulses is controlled in accordance with the displacement of the brake force potentiometer 30 or the hand control potentiometer 31 described above. Although one braking coil is shown, there is usually one braking coil 51 for each wheel to be braked on the towed vehicle.

When braking current from the transistor 63 turns off, the diode 71 provides a current path to continue current flow through the brake coil 51. During short duration (short pulse) operation, which is with low braking current, the current through diode 71 will cease before the next pulse because the energy is consummed by the resistance of the coil 51. During long on-time operation, which is with high braking current, current flows through the diode 71 until the transistor 63 turns on again. This feature avoids damaging the transistor 63 and other components in the amplifier 56 and conserves energy.

Further protection for the high current output transistor 63 is also provided, and this is accomplished by a diode 73 which has substantial peak current capability. If the circuitry is attempted to be connected in reverse fashion to the vehicle battery 2, the diode 73 will draw momentary very high current through the towing vehicle battery 22 and will blow a fuse 75 which is to prevent destruction of the transistor 63 and perhaps other transistors as well.

It is also possible through wear and exposure to the elements that the leads to the braking coil 51 may become shorted. In the case of short circuit of the output lead, the braking system of this invention includes a positive-acting short circuit protection system.

The short circuit protection circuitry is indicated by the reference numeral 77. The main current carrying circuit for battery 22 is through the emitter-collector path of the transistor 63 and the resistor 65. Upon a short circuit condition developing at the output; for example, in the leads to the coil 51, the rise in current will generate a substantial drop across the resistor 65. This voltage is applied to the base of a transistor 79, rendering the transistor 79 conductive. The conduction of transistor 79 then charges a capacitor 81 through a fairly low resistance resistor 83 to bias another transistor 85 into conduction. The output of the transistor 85 develops a turn off voltage across a load resistor 87 which is then applied to the other input of the AND gate 55. This turns off the AND gate 55 so that no further output pulses are developed until the transistor 85 is turned off. The transistor 85 remains conductive until the capacitor 81 discharges through a resistor 84 and a resistor 91. The time constant of this discharge path is approximately 10 times as long as the charging time of the RC circuit including the resistor 83 and the capacitor 81. Therefore, the AND gate 55 is prevented from conducting for ten times as long as a momentary pulse resulting from a short circuit condition. When the transistor 85 ceases conduction after the capacitor 81 has discharged, the circuit 77 is ready to disable the output under another output cycle from the modulator 46.

It should be noted that a light emitting diode 93 which is connected across the coil and in series with current limiting resistor 95 will be energized as long as there is no short, and thus, illuminated. When a short occurs, the diode 93 will not illuminate.

The brake force potentiometer 30 may be of the construction shown in FIG. 6. The potentiometer 30 has an outer case 101 of insulating material, such as phenolic or other plastic compound. A plunger 103 is movable longitudinally through an aperture in the end of the case 101 and along guideways (not shown). The plunger 103 is under tension of a compression spring 105 which forces the plunger 103 and a shoulder stop 107 on the plunger 103 towards the case 101. Unless the plunger 103 is depressed, the shoulder stop 107 will rest against the end of the outer case 101. A plug 109 of a similar insulating material closes the rear end of the case 101 and provides a suitable guide recess 110 for the spring 105.

Also contained in the case 101 is a resistance board or element 111 shown in FIG. 7. Suitable leads 112, 113 and 114 are brought to the outside of the case 101 from the ends of the resistance element 111. The plunger 103 includes a contact 115 which engages the resistance board 111 as the plunger 103 is moved to provide the desired variable resistance.

As viewed in FIG. 7, the resistance board 111 includes a conductive portion 116 which is connected by the lead 112 to the OR gate 32 in the FIG. 5 circuit, a shorting portion 117, which is connected by the lead 113 to ground, and a resistance portion 118, which is connected to the top of the potentiometer 30 and thus the control voltage Vcc. Therefore, as the contact 115 is moved downwardly as observed in FIG. 7, it engages the portions 116, 117 and 118. Since the shorting portion 117 is connected to ground, it provides a short circuit to resistance portion 118 and no power is applied to the OR gate 32 until the contact 115 moves further downwardly and beyond the portion 117. Thereafter, the resistance is varied and accordingly the voltage applied to OR gate 32. The purpose of the shorting resistance portion will be subsequently described in conjunction with FIGS. 3 and 4.

In FIG. 8, the potentiometer 30 is part of the pressure transducer 13 which is adapted to be actuated by the pressure of the hydraulic fluid from the master cylinder 11 shown in FIG. 1. The potentiometer case 101 is carried within a cylindrical housing 121. The case 101 of the potentiometer 30 is secured by a circular swage 123 which grips and positions the potentiometer case 101 in a selected position. The physical displacement for the plunger 103 of the potentiometer 30 is derived from a hydraulic actuator 125. The actuator 125 includes a cylinder 126 which is adapted to be connected at 127 to the master cylinder 11. A piston 128 has a seal 129 at the pressure and a stop 130 at the opposite end. The front end of the piston 128 abuts a separator 131 which is spring biased by two springs 133 and 135. The spring 133 is merely for preventing dimensional stack up problems whereas the rate of the spring 135 affects the application of the towed vehicles brakes 15 when pressure is applied to the piston 128.

The entire assembly 13 of FIG. 8 may be conveniently mounted near the master cylinder 11. A clamp 137 may be provided to make the proper mounting.

In FIG. 9, the details of the brake pedal transducer assembly 21, which used the potentiometer 30 of FIG. 6 are illustrated. This pressure transducer assembly 21 is adapted to be directly secured to the brake pedal 10, and therefore, the plunger 103 will be displaced in response to pedal force provided by the tow vehicle operator. A base plate 141 has a foot pedal pad; 143 hinged together by a hinge pin 145. The pedal pad 143 is urged away from the base plate 141 by a spring 147 positioned between the pedal pad 143 and the base plate 141. The spring 147 can be any suitable type but preferable is of the leaf spring type. The pedal pad 143, which is movable with respect to the base plate 141, has on one end an extension 149 which is positioned opposite the plunger 103 of the variable potentiometer 30.

The variable potentiometer 30 is carried in a housing 151. The housing 151 is firmly secured and is rigid with respect to the base plate 141. Upon the application of foot pressure to the pedal pad 143, the pedal pad 143 and its extension 149 will pivot around the hinge pin 145 and the extension 149 will cause the plunger 103 to be displaced toward the body of the potentiometer 30 in accordance with the amount of pressure exerted upon the pedal pad 143. This pedal 140 can be attached to the brake pedal 10 by positioning the base plate 141 on the brake pedal 10 with securing straps 153 which are attached to the base plate.

To explain how the present invention achieves balanced braking between the towing and the towed vehicles, it should be understood that to obtain balanced braking, the deceleration of the towed vehicle caused by the towed vehicle brakes alone must equal the deceleration of the towing vehicle provided by the towing vehicle brakes alone. Therefore, the combined vehicles' deceleration also equals this value. Consequently, the stopping distance of the combined vehicle will also equal that of the towing vehicle alone. As the deceleration of each mass due to its braking force alone must be equal, the towed vehicle braking force (Ft) must always be proportional to the towing vehicle brake force (Ftv). The proportionality constant is the ratio or the towed vehicle weight (Wt) to the towing vehicle weight (Wtv): or, $Ft = Wt/Wtv \; Ftv$. Accordingly, a heavy towing vehicle towing a light trailer (towed vehicle) requires much less trailer brake force than would be the case if the situation were reversed.

With the foregoing in mind, reference is made to the FIG. 3 graph wherein the ordinates are designated as magnet current in amperes and brake force in pounds. As illustrated by the curve, which is typical for an electric brake, the brake force is somewhat nonlinear for low values of current, then becomes linear and finally at higher values of current again becomes nonlinear. These deviations are emphasized by the depicted straight line. While the FIG. 3 curve is typical for electric brakes, the corresponding curve for a hydraulically braked vehicle is a substantially straight line. This is because deceleration of a hydraulically braked vehicle has an almost linear relationship with the brake line pressure. This difference between the electric brake curve and the hydraulic brake curve highlights the problem of providing balanced braking between the towing and the towed vehicles.

Referring next to the FIG. 4 graph for the controller 14, the depicted lines are labeled "Normal Gain", "Maximum Gain" and "Minimum Gain". The lines labeled "Maximum" and "Minimum" gain indicate the sensitivity variations or the specific characteristic between the minimum gain line and the maximum gain line. This variation in the present invention is provided by the adjustment of the gain control knob 38 on the side of the controller 14 (See FIG. 1). This control knob 38 in turn adjusts the trim potentiometer 36, whereas the threshold potentiometer 39 establishes the threshold or starting point for the gain lines. Therefore, the setting of the trim potentiometer 36 determines whether operation is at or between the minimum gain and the maximum gain lines. The slope of the gain lines is determined primarily by the spring 135 in the FIG. 8 embodiment and the spring 147 in the FIG. 9 embodiment.

As shown in FIG. 4 graph there is no current developed until approximately 70 PSI. This is because the shorting portion 117 of the resistance element 111 shorts the output from the potentiometer 30 until this brake line pressure is attained. Current thereafter rises rapidly along the vertical line to the starting point of one of the selected gain lines and then increases linearly with the brake line pressure. This abrupt step at 70 PSI overcomes the nonlinear electric brake characteristic mentioned at low level currents with respect to the FIG. 3 graph and also precludes generating undesired brake current for the towed vehicle when the brake pedal 10 of the towing vehicle is being inadvertently depressed without intending to develop a brake pressure, i.e., the driver is riding the brake pedal 10 of the towing vehicle. The potentiometer 30 provides this same feature when employed with the FIG. 9 embodiment.

Also, as can now be appreciated, after the initial step on the FIG. 4 graph, linearity has been achieved both with the FIG. 8 embodiment and the FIG. 9 embodiment. Therefore, as determined by the towed vehicle/towing vehicle weight ratio desired, the trim potentiometer 36 is adjusted by the control knob 38 within the range provided between the minimum and maximum gain lines in FIG. 4. By way of example and without limitation, a weight ratio of 0.5 to 2.0 has been determined acceptable. This weight ratio adjustment is achieved without the need for an external compensating resistor.

In an actual embodiment of FIG. 1, the circuit components were as follows:

| | |
|---|---|
| Resistor 27 | 150 Ohms |
| Capacitor 28 | 10 mf |
| Zener diode 29 | IN4739 |
| Potentiometer 30 | 5000 ohms |
| Diode 33 and 34 | IN4148 |
| Potentiometer 36 | 10 Kohms |
| Resistor 37 | 5.6 Kohms |
| Potentiometer 39 | 220 Kohms |
| Transistor 40 | 2N4126 |
| Transistor 41 | 2N4124 |
| Resistor 43 | 2.4 Kohms |
| Capacitor 44 | 1.0 mf |
| Pulse Width Modulater | LM556 |
| Resistor 49 | 39 Kohms |
| Capacitor 50 | .033 mf |
| Resistor 57 | 2 Kohms |
| Transistor 58 | 2N4401 |
| Resistor 59 | 100 Ohms |
| Transistor 61 | T1P42 |
| Transistor 63 | 2N5301 |
| Resistor 95 | 680 Ohms |
| Diode 71 | 6amp., 400 piv |
| Diode 73 | 3amp., 50 piv |
| Transistor 79 | 2N4403 |
| Resistor 83 | 200 Ohms |
| Transistor 85 | 2N4124 |
| Resistor 87 | 4.7 Kohms |

-continued

| | |
|---|---|
| Capacitor 81 | .47 mf |
| Resistor 84 | 10 Kohms |
| Resistor 91 | 10 Kohms |

To summarize the operation reference is now made to FIG. 1. Initially the foot pedal 10 is depressed to actuate the towing vehicle hydraulic brakes 12 through the agency of the master cylinder 11. After the aforedescribed slight amount of displacement of the foot pedal 10 to achieve the 70 PSI brake line pressure, the brake force potentiometer 30 becomes operative. This control signal is then transferred successively through the OR gate 32, voltage divider network 35, the amplifying stages provided by the transistors 40 and 41, the load circuit 42 and to the input of the comparator 45 in the pulse width modulator 46. It is the DC level of the control signal at the output of the brake force potentiometer 30 that is varied to represent the brake force applied to the brake pedal 10 in either the FIG. 1 or the FIG. 2 embodiments. The DC level of the control signal at the output of the trim potentiometer 36 additionally reflects the desired proportion of the control signal to be used to achieve towed vehicle deceleration equal to the towing vehicle decleration at the weight ratio of the vehicles with which the controller 14 is being employed. This proportion is determined by the adjustment of the potentiometer 36.

In the pulse width modulator 46, the RC circuit 48 and the free running oscillator 47 combine with the comparators 53 and 54 to develope a triangular wave voltage at the desired frequency. The triangular is then supplied to the other input to the comparator 45 where the amplitude of the triangular waveform is compared with the DC level of the control signal. A pulse width modulated output voltage is developed with a pulse width proportional to this DC level and at the triangular waveform frequency.

The modulated output from the comparator 45 is approximately linear with input and is supplied by way of the AND gate 55 to the current amplifier 56. The current amplifier 56 functions to provide an output of up to 15 amperes or more. Thus, the towed vehicle brakes are actuated by variable width voltage pulses, the duty cycle of which is controlled by the displacement of the brake pedal 10.

The foregoing operation can be achieved with the hand control 26 so as to actuate the towed vehicle brakes 15 directly without actuating towing vehicle brakes. The hand control 26 permits separate operation of towed vehicle brakes for testing or emergency purposes. To operate, the hand control 26 on the controller 14 in FIG. 1 is moved in the direction of the arrow against a return spring bias. This adjusts the hand control potentiometer 31 and the resultant control signal at the DC level determined by setting of the potentiometer 31 is, as before described, transferred to the OR gate 32 where it will prevail as long as it exceeds the DC level from the potentiometer 30.

If the output pulse from the current amplifier exceeds a selected current value; e.g., 20 amps the short circuit protection circuit 77 will become energized to develop an output cut off pulse which is transferred to the AND gate 55 in the pulse width modulator 46. This cut off pulse will turn off the AND gate 55 and shut down the modulator 46.

What is claimed is:

1. A braking system for controlling electrically operated brakes for a driver controlled vehicle comprising braking means electrically energizable for applying a braking force to the brakes, an electric energy source, control means selectively adjustable by the driver in accordance with a desired braking force, said control means developing a control signal only after a predetermined initial adjustment that varies rapidly from a threshold magnitude to a certain magnitude and thereafter varies linearly with a further adjustment thereof, controller means operative to couple said braking means to said source in response to such control signal, said controller means developing a pulsating output for energizing said brake means having a predetermined frequency and having a pulse width determined by the magnitude of such control signal, and excessive current protection means operative in response to a predetermined high current level in such controller means output for inhibiting such controller means output for a predetermined limited period of time including an AND gate having a plurality of inputs and an output, means supplying the pulsating output to one of said gate inputs, means connecting said gate output to energize said brake means, and means connected to another of said gate inputs for blocking said gate output for such predetermined limited time period in response to such predetermined high current level in the controller output.

2. The braking system of claim 1, wherein said controller means comprises a pulse width modulator including an oscillator developing a substantially constant peak amplitude output at the predetermined frequency, and means comparing the amplitude of such oscillator output with the control signal to develop the pulsating output.

3. A system for operating electrically energizable brakes in a towed vehicle in response to a driver in a towing vehicle comprising driver responsive means for generating a control signal indicative of a desired towed vehicle braking force, means responsive to such control signal for generating a pulsating signal having a predetermined frequency and a pulse width proportional to the desired towed vehicle braking force, means for energizing the towed vehicle brakes from said pulsating signal, means sensing the current level of said pulsating signal, and means responsive to such sensed current level exceeding a predetermined maximum current for inhibiting energizing of the towed vehicle brakes from such pulsating signal and wherein said means for energizing the towed vehicle brakes includes an AND gate having two inputs and an output, means applying such pulsating signal to one of said gate inputs, means for energizing the towed vehicle brakes from said gate output, and wherein said inhibiting means includes means connected to the other gate input for blocking said gate output in response to such sensed current exceeding said predetermined maximum current.

4. The brake system of claim 3; wherein said inhibiting means includes means for inhibiting the pulsating signal for a predetermined limited time interval whereby the pulsating signal is reapplied after said limited time interval to reenergize the towed vehicle brakes until such sensed current level again exceeds said predetermined maximum current.

5. A braking system for controlling electrically operated brakes for a driver controlled vehicle comprising braking means electrically energizable for applying a braking force to the brakes; control means selectively adjustable by the driver in accordance with the desired braking force and including hand controlled impedance means and foot controlled impedance means, each adjustable by the driver to develop a DC output control signal, OR gate means operative in response to each of the controlled signals to pass the control signal of the highest magnitude; controller means operative to energize said braking means including a pulse width modulator having oscillator means developing a triangular waveform output of a certain amplitude at a predetermined frequency, means comparing the amplitude of such triangular output with the magnitude of the highest control signal to develop a pulsating output at said predetermined frequency that has a pulse width determined by the magnitude of the highest control signal; and AND gate means having plural inputs and an output with one of said gate inputs coupled to such pulsating output and said gate output operatively couple to energize said braking means; and excessive current protection means having an output coupled to the other of said AND gate inputs and responsive to the current level of said pulsating output exceeding a certain excessive current level to turn off said AND gate means.

6. The braking system as set forth in claim 5 and further including means matching the impedance of said control means with said controller means.

7. A braking system set forth in claim 6, and further including threshold potentiometer means selectively adjustable to establish a threshold level for the control signal.

* * * * *